United States Patent
Siraky

(10) Patent No.: US 6,359,409 B1
(45) Date of Patent: Mar. 19, 2002

(54) ENCODER

(75) Inventor: Josef Siraky, Donaueschingen (DE)

(73) Assignee: Max Stegmann GmbH Antriebstechnik-Elektronik, Donaueschingen (DE)

(*) Notice: Subject to any disclaimer, the term of this patent is extended or adjusted under 35 U.S.C. 154(b) by 0 days.

(21) Appl. No.: 09/560,114

(22) Filed: Apr. 28, 2000

(30) Foreign Application Priority Data

May 19, 1999 (DE) ..................... 299 08 796 U

(51) Int. Cl.$^7$ .................... G05B 19/42; G01B 11/26
(52) U.S. Cl. ................... 318/560; 318/480; 318/690; 356/241; 250/231.13; 73/514.26; 73/623
(58) Field of Search ............... 318/568.1, 576, 318/561, 577, 560; 356/241; 250/231.13, 231.18, 231.14, 231 SE, 229, 551, 231.16; 359/17, 211, 495, 566; 600/117, 103; 73/623, 514.26

(56) References Cited

U.S. PATENT DOCUMENTS

| | | | | |
|---|---|---|---|---|
| 3,637,312 A | * | 1/1972 | Cantor et al. |
| 3,936,712 A | * | 2/1976 | Gerber et al. |
| 4,625,109 A | * | 11/1986 | Nixon |
| 4,752,683 A | * | 6/1988 | McGuire |
| 4,825,070 A | * | 4/1989 | Arimura |
| 4,906,846 A | * | 3/1990 | Arimura |
| 5,107,107 A | * | 4/1992 | Osborne |
| 5,336,884 A | * | 8/1994 | Khoshnevisan et al. |
| 5,481,394 A | * | 1/1996 | Kramer et al. |
| 5,573,492 A | * | 11/1996 | Dianna et al. |
| 5,770,800 A | * | 6/1998 | Jenkins et al. |
| 5,983,720 A | * | 11/1999 | Crabb et al. |
| 6,031,222 A | * | 2/2000 | Carapelli |
| 6,100,972 A | * | 8/2000 | Harley et al. |

FOREIGN PATENT DOCUMENTS

| | | |
|---|---|---|
| DE | 40 13 936 A1 | 10/1991 |
| DE | 43 10 405 C1 | 9/1994 |
| DE | 195 06 019 A1 | 9/1996 |
| GB | 2276719 A | 3/1993 |
| JP | 7-327998 A * | 12/1995 |

* cited by examiner

Primary Examiner—Paul Ip
(74) Attorney, Agent, or Firm—Hutchins, Wheeler & Dittmar

(57) ABSTRACT

An encoder operates in accordance with the transparent scanning principle. The encoder includes a rotating shaft, a partial disk connected nonrotatably concentrically with the shaft, an illuminating unit, and a scanning receiver located axially in front of the end of the shaft. The illuminating unit is connected nonrotatably centrally with the shaft and rotates with the shaft on the side of a partial disk that faces away from the scanning receiver. The scanning receiver includes a monolithic photoreceiver array which is formed with photosensitive sensor areas associated with an angular displacement of the partial disk.

36 Claims, 5 Drawing Sheets

ENCODER

BACKGROUND OF THE INVENTION

1. Field of the Invention

The present application relates to an encoder, and more particularly to an encoder operating in accordance with the transparent scanning principle.

2. Description of Related Art

In encoders that operate by the transparent scanning principle, a translucent partial disk, the so-called code disk, provides a measurement of angular displacement. On one side of the disk is an illuminating unit consisting of a light transmitter and a collimator lens, while on the opposite side there is a photoelectric scanning receiver. The light emitted by the light transmitter or from the illuminating unit is modulated by the angular displacement of the partial disk. The scanning receiver converts the modulated light signals into electrical measurement signals. The angular displacement can be incrementally or absolutely encoded. Encoders of this type are used in particular for measuring the angle and/or the angular velocity.

Encoders according to the prior art use a shaft during self-orientation which can also be designed as a hollow shaft and is connected nonrotationally with the drive shaft. The stator of the encoder is also connected nonrotatably by a torque support on the axle bearing housing of the drive shaft.

Encoders without their own bearings, so-called KIT encoders, that use the transparent scanning principle, have a code disk connected permanently with a drive shaft as well as a module fastened to the housing consisting of an illumination unit and a scanning receiver located on the opposite side of the code disk.

In order to keep the centrifugal forces acting on the partial disk low even at high rpm values and to prevent destruction of the partial disk consisting of glass or plastic, it is known from DE 40 13 936 A1 to place the partial disk in the end of the rotating shaft to be measured. The end of the shaft is located opposite a fixed housing end. An LED integral with the housing extends through a central opening in the partial disk. A reflector is placed in the coaxial bore at the end of the shaft and reflects the light from the LED as a parallel light bundle through the partial disk. The light passing through the partial disk is scanned by photodiodes located concentrically to the LED in the housing end. The arrangement of the LED and the scanning concentrically to the shaft permit a significant reduction in the diameter of the partial disk and hence a reduction of the centrifugal forces acting on the partial disk. The encoder can therefore be operated at much higher rpm values until centrifugal forces appear that may cause damage to the partial disk. Since the partial disk is inserted into the shaft, the encoder is engaged and supported at its outer circumference by the shaft. This support of the partial disk at its outer circumference as well as the smaller inertial moment of the disk permit higher rpm values.

In the foregoing encoder, the LED is a light source in the end of the housing. The photodiodes are placed around this LED in the end of the housing as well. When the encoder is assembled, the photodiodes must be adjusted individually in a costly manner in order to obtain a mutually concentric arrangement as well as an arrangement that is concentric to the axis of the shaft. Thus, it would be desirable to have an encoder having a simplified design and assembly that does not require, for example, individual adjustment of the photodiodes.

SUMMARY OF THE INVENTION

In accordance with principles of the invention, an encoder operates in accordance with the transparent scanning principle. The encoder includes a rotating shaft, a partial disk connected nonrotatably concentrically with the shaft, an illuminating unit, and a scanning receiver located axially in front of the end of the shaft. The illuminating unit is connected nonrotatably centrally with the shaft and rotates with the shaft on the side of a code disk that faces away from the scanning receiver. The scanning receiver includes a monolithic photoreceiver array which is formed with photosensitive sensor areas associated with an angular measurement of the partial disk.

In the encoder according to the invention, the illuminating unit is inserted coaxially into the shaft or connected nonrotatably with it and turns with the shaft. The scanning receiver contains a monolithic photoreceiver array and is located centrally and axially in front of the end of the shaft. The scanning receiver may be a SoC OptoChip (SoC: System-on-Chip), and may include semiconductor components in addition to the photoreceiver array, for example components related to signal processing. In some embodiments, each track of the partial disk has four groups of photoreceivers as photosensitive areas of the monolithic array which are each offset 90°. The signals from each of the groups of photoreceivers may be averaged to compensate for possible eccentric motion of the partial disk. Thus, requirements for the bearing and running tolerances of the partial disk may therefore be reduced. By designing the scanning receiver as a monolithic array, the need for individual adjustment of the photoreceiver on assembly is greatly reduced, if not eliminated. Since the phototransmitter is not located concentrically within the photoreceiver, it is possible to arrange the photoreceivers with a smaller diameter so that the radial dimensions can be reduced further, thus increasing the admissible rpm values.

The encoder according to the invention may be designed with or without its own bearing. In the embodiment in which the encoder includes its own bearing, the drive shaft and the encoder shaft are connected nonrotatably with one another and the encoder shaft contains the illuminating unit as well as the code disk. The stator of the encoder and the axle bearing housing of the drive shaft are connected together nonrotatably by a torque support.

In a KIT version without its own bearing, the code disk as well as the illumination unit are connected nonrotatably with the drive shaft to be measured. Thus, in one embodiment, the phototransmitter is enclosed in a bore made coaxially in the end of the shaft and turns with the drive shaft. The partial disk bearing the angle code may be located between the illuminating unit and the scanning receiver. The scanning receiver may be fastened to the housing. In contrast to the previous encoders that lack their own bearings, only the scanning receiver is attached nonrotatably to the housing.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT(S)

Figure 1:
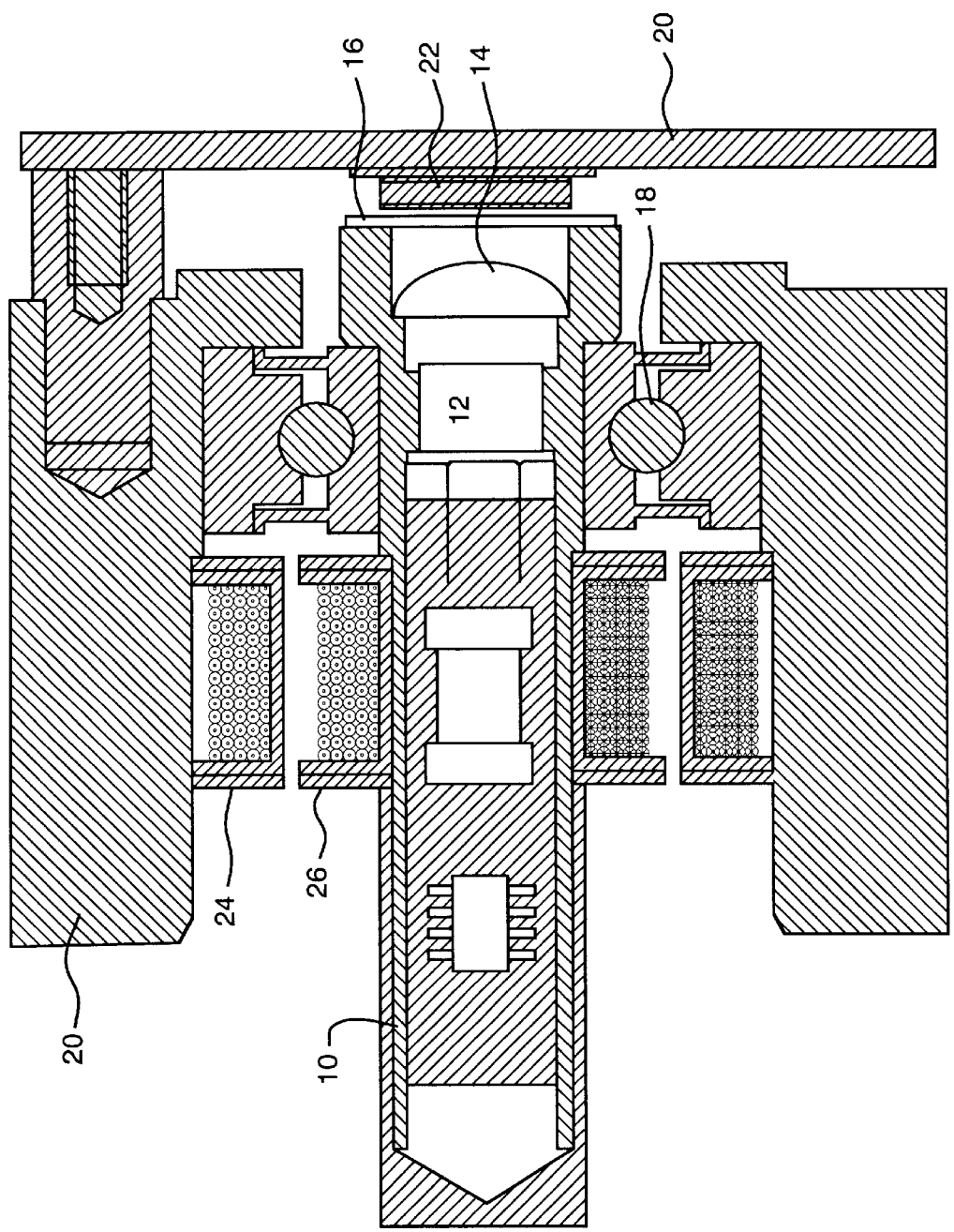
FIG. 1 is an axial section through the encoder in a first embodiment.

The encoder has a rotating shaft 10 which may be, for example, the shaft of a motor. Alternatively, the rotating shaft 10 may be coupled with the shaft of a motor. A bore is provided coaxially in the free end of the shaft 10. In this bore, a light source 12 is located coaxially to the shaft 10 and is preferably an LED. A collimator lens 14 is inserted into the bore in front of the light source 12 and bundles in parallel the light emitted by the light source 12. Because of the short distance from the partial disk, the collimator lens 14 may also be absent under some circumstances. A partial disk 16 made of glass, a translucent plastic, or a metal diaphragm with punched-out openings is inserted concentrically into the end of the shaft 10 and is used in providing an angular measurement. The angular measurement may be determined incrementally or absolutely using one or more concentric tracks.

It should be noted that the LED can also be an OLED (organic LED) and may be mounted approximately flush directly on the side of the code disk facing away from the scanning receiver. Photoluminescence as well as electroluminescence are both possible operating methods.

The free end of the shaft 10 is rotatably mounted in a housing 20 by means of one or more radial ball bearings 18. Other types of bearings may be provided, such as slide bearings. The Housing 20 is preferably nonrotatably mounted by a coupling to be radially and elastically flexible, for example, connected with the housing of the motor on whose shaft the encoder is located.

A scanning receiver 22 is mounted fixedly in the housing 20, axially in front of the end of the shaft 10 and hence in front of the partial disk 16. The scanning receiver 22 has the form of a disk parallel to the partial disk 16 and designed as a monolithic photoreceiver array located centrally with respect to the axis of the shaft 10. The monolithic array of the scanning receiver 22 has photosensitive sensor areas 28 that are arranged concentrically corresponding to the partial disk 16 used in providing angular measurements.

Figure 2:
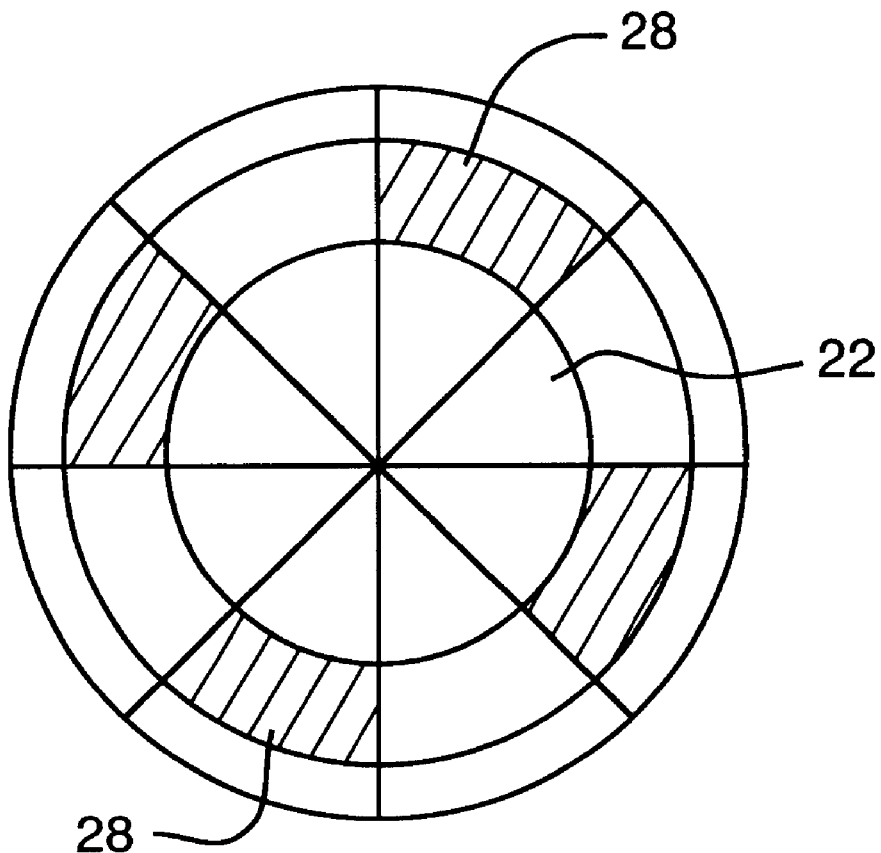
FIG. 2 shows the scanning receiver of the encoder in an axial view.

In the embodiment shown in FIG. 2, four sensor areas 28 are provided each offset by 90°. The Sensor areas 28 convert the light signal coming from the light source 12 and modulated by the angular measurement of the partial disk 16 into electrical signals that are evaluated to measure the angular position or angular velocity or angular acceleration of the shaft 10. If four sensor areas 28, each offset by 90°, are provided as shown in FIG. 2, the corresponding signals from the sensor areas 28 are averaged to compensate the bearing and running tolerances of the shaft 10 and hence of the partial disk 16 from the scanning receiver 22. In order to feed electrical energy for the light source 12 into the rotating shaft 10, an inductive feed is provided in the embodiment of FIG. 1. For this purpose, a stator coil 24 is located coaxially to the shaft 10 in the housing 20 by means of which the electrical energy is transmitted by induction into a rotor coil 26 rotating with the Oshaft 10. The rotor coil 26 may include a coil core made of a ferromagnetic or ferrimagnetic material. An alternating voltage is applied to an outer stator coil 24 and induces supply voltage for the light source 12 in the inner rotor coil 26.

Alternatively, the supply current for the light source 12 may also be fed galvanically to the shaft 10. For this purpose, sliding contacts may be used. To avoid frictional resistance and wear of sliding contacts, the galvanic energy supply may also be provided through the ball bearings or the slide bearings 18 that support the shaft 10, as shown, for example, in the case of ball bearings in FIGS. 3 and 4. Alternating voltage U is supplied through two ball bearings 18 to the shaft 10. The ball bearings 18 are separated from one another within the shaft 10 by insulator ISO. The alternating voltage U is fed through the ball bearing 18 both galvanically and also in part capacitively. This is symbolized in the equivalent circuit in FIG. 4 by the fact that the ball bearings 18 are replaced by their ohmic resistances R and their capacitance C1. The alternating voltage supply to the shaft 10 is rectified by a rectifier GL and smoothed by a capacitor C. Additionally, voltage stabilization SP can be provided to stabilize the DC voltage supplying the light source 12.

Figure 3:
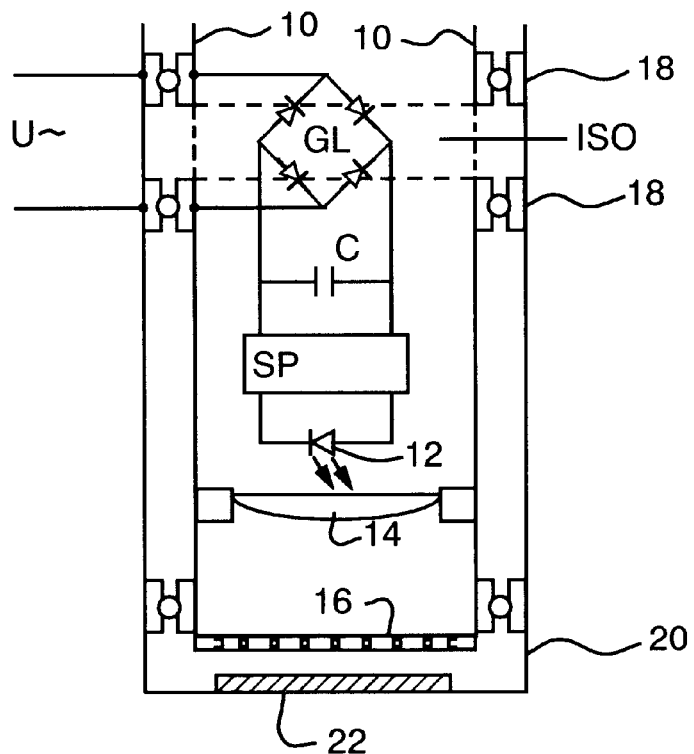
FIG. 3 is a modified embodiment of the power supply for the light source.
Figure 4:
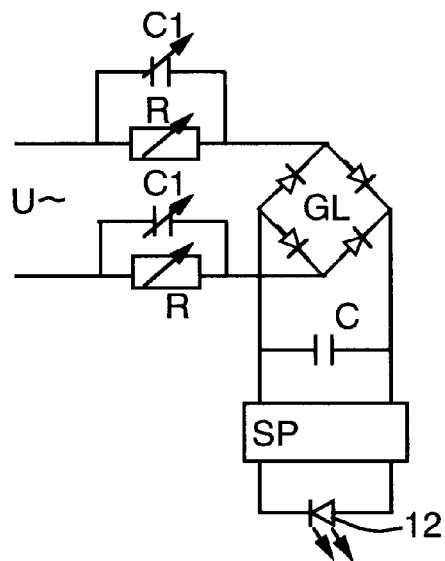
FIG. 4 is an equivalent circuit diagram of the power supply of FIG. 3.
Figure 5:
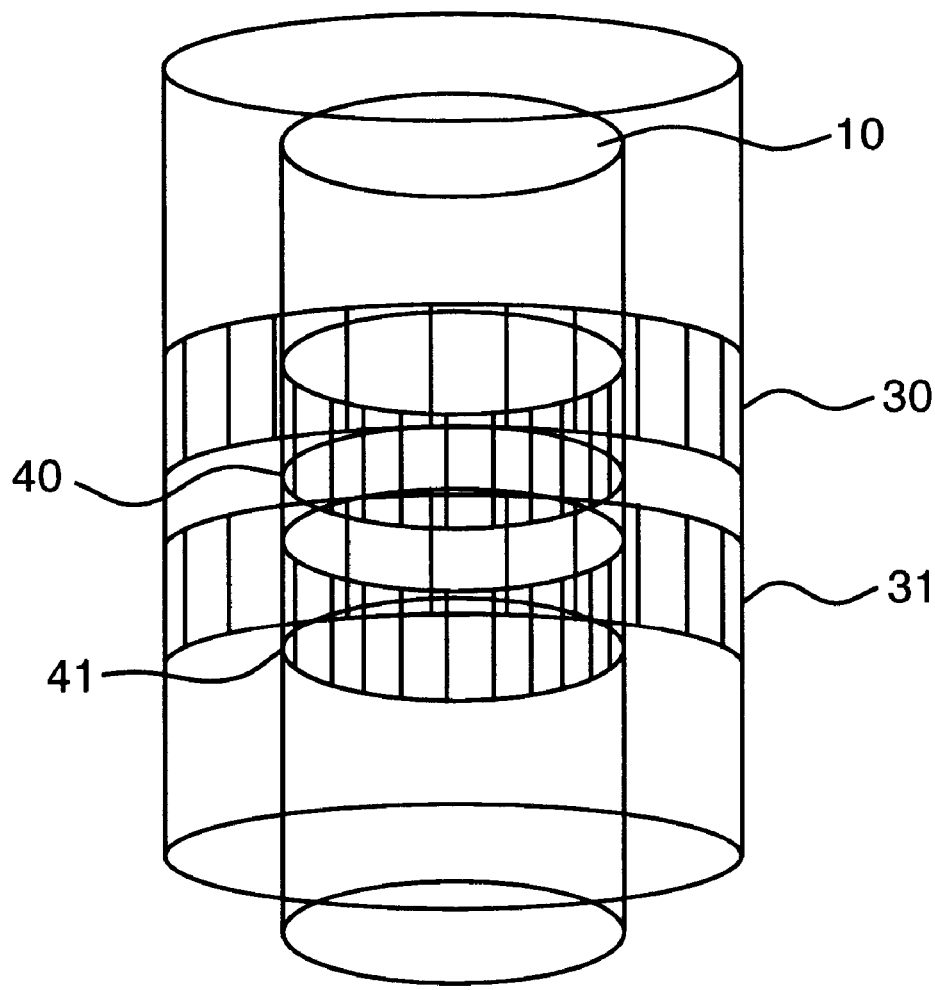
FIG. 5 is a schematic modification of the power supply.
Figure 6:
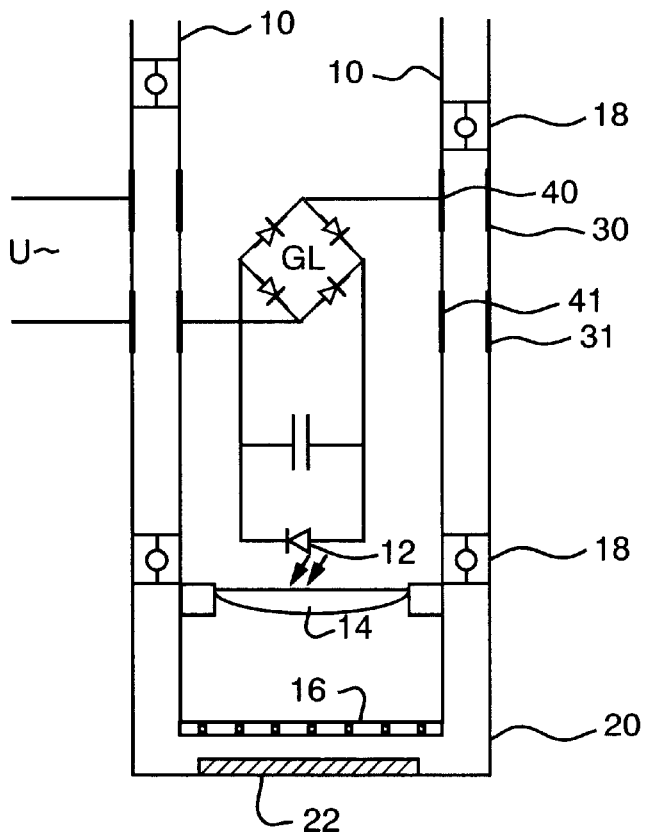
FIG. 6 is the modified embodiment of the power supply according to FIG. 5.
Figure 7:
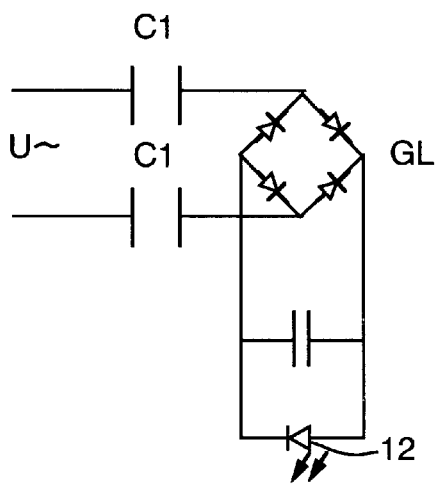
FIG. 7 shows the equivalent circuit diagram of the power supply according to FIG. 6.

In another embodiment shown in FIGS. 5 to 7, the energy supplying the light source 12 is fed capacitively to the shaft 10. For this purpose, metal surfaces 30 and 31 are located in the housing, are spaced apart axially, and surround the shaft 10 coaxially as annular bands. The metal surfaces 30 and 31 may have the shortest possible radial distance from shaft 10 to increase the capacitance. On the outer circumference of shaft 10, metal surfaces 40 and 41 are associated with the metal surfaces 30 and 31, and have substantially the same axial position and the same axial width as the metal surfaces 30 and 31. Alternating voltage U is coupled capacitively into the shaft 10 by capacitances C1 formed by the metal surfaces 30 and 40 and 31 and 41 and rectified, smoothed, and stabilized there in suitable fashion as shown in FIGS. 3 and 4.

In the light source 12 in the form of an LED with a current of about 5 to 10 mA and a voltage of about 1.2 volts, inductive coupling is possible, for example, with an alternating voltage frequency in the kHz to MHz range. Alternatively, directly optically coupled light may be used as the light source unit 12.

For this purpose, a light guide inserted centrally into the shaft can also be provided, fed by an LED, or a medium irradiated by an external light source and emitting light itself (photoluminescence). For example, crystals or polymers may be used which are pumped by laser diodes and emit coherent light themselves (so-called solid-state lasers or polymer lasers).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. An encoder comprising:
    a rotating shaft;
    a partial disk connected nonrotatably centrically with the rotating shaft;
    an illuminating unit; and
    a scanning receiver located axially in front of a first end of the rotating shaft, wherein the illuminating unit is connected nonrotatably centrically with the rotating shaft and rotates with the rotating shaft on a side of said partial disk opposite the scanning receiver, said scanning receiver including a monolithic photoreceiver array comprising photosensitive sensor areas associated with an angular measurement of the partial disk.

2. The encoder of claim 1, wherein a bore is provided coaxially in a free end of the rotating shaft, and the illuminating unit further includes:

a light source inserted centrally into the bore; and a collimator lens inserted centrally into the bore in front of the light source.

3. The encoder of claim 2, wherein the monolithic photo receiver array includes a plurality of sensor areas offset from one another by angles and arranged concentrically to an axis of rotating shaft.

4. The encoder of claim 3, wherein the illuminating unit is an electrical light source supplied with an alternating voltage that is set into the rotating shaft.

5. The encoder of claim 4, wherein the electrical light source is a luminous diode and the encoder further includes:

a rectifier coupled to the shaft for rectifying the alternating voltage provided through the shaft;

a capacitor coupled to the rectifier for smoothing an output of the rectifier; and a voltage stabilizer coupled to the capacitor for stabilizing the output of the rectifier.

6. The encoder of claim 5, wherein the alternating voltage is coupled inductively into the rotating shaft through one or more coils.

7. The encoder of claim 5, wherein the alternating voltage is coupled capacitively into the rotating shaft through concentric metal surfaces.

8. The encoder of claim 5, wherein a supply current is supplied galvanically to rotating shaft.

9. The encoder of claim 5, wherein the alternating voltage is supplied to the rotating shaft by one of roller bearings and slide bearings that support the rotating shaft.

10. The encoder of claim 3, wherein the illuminating unit is formed by light coupled directly and optically into the rotating shaft.

11. The encoder of claim 10, further including:

a light guide placed centrally in the rotating shaft as an illuminating unit.

12. The encoder of claim 3, wherein a luminescent medium is placed in the shaft as an illuminating unit.

13. The encoder of claim 1, wherein the monolithic photoreceiver array includes a plurality of sensor areas offset from one another by angles and arranged concentrically to an axis of the rotating shaft.

14. The encoder of claim 1, wherein the scanning receiver is a system designed on a semiconductor chip that includes one or more additional semiconductor components performing a portion of signal processing operations.

15. An encoder comprising:

a partial disk adapted to be mounted on a rotating shaft;

a light source adapted to be mounted centrally to the rotating shaft; and a scanning receiver that includes a monolithic photoreceiver array comprising photosensitive sensor areas associated with an angular displacement corresponding to the partial disk, said sensor areas converting a light signal from the light source modulated by the angular displacement of the partial disk into electrical signals evaluated to measure the angular position of the shaft.

16. The encoder of claim 15, wherein said scanning receiver is a disk parallel to said partial disk located centrally with respect to axis of said shaft.

17. The encoder of claim 16, wherein said monolithic photoreceiver array includes four sensor areas in which each of said four sensor areas are offset by 90 degrees.

18. The encoder of claim 15, further including:

an illuminating unit located coaxially to the shaft in a bore provided in a free end of the shaft.

19. The encoder of claim 18, further including:

a collimator lens inserted into the bore in front of said illuminating unit.

20. The encoder of claim 19, wherein said partial disk is inserted concentrically into an end of the shaft.

21. The encoder of claim 20, wherein said free end of the shaft is rotatably mounted in a housing using at least one bearing.

22. The encoder of claim 21, wherein said bearing is one of a slide bearing and a ball bearing.

23. The encoder of claim 21, wherein said housing is nonrotatably mounted by a coupling providing flexibility.

24. The encoder of claim 18, wherein said light source is one of an LED and an organic LED.

25. The encoder of claim 18, further wherein said illuminating unit and said partial disk are coupled to a shaft being measured.

26. The encoder of claim 21, wherein only said scanning receiver is attached nonrotatably to said housing.

27. The encoder of claim 17, wherein signals from said four sensor areas are used to compensate for bearing and running tolerances of said partial disk.

28. The encoder of claim 15, further including a light source having an inductive energy feed using a first coil located coaxially in said shaft, electrical energy being transmitted by induction into a rotor coil rotating with said shaft by applying an alternating voltage to said first coil and inducing a supply voltage for said light source into said rotor coil.

29. The encoder of claim 28, wherein said rotor coil is one of a ferromagnetic material and a ferrimagnetic material.

30. The encoder of claim 15, further including a light source having a galvanic energy feed.

31. The encoder of claim 30, wherein said galvanic energy feed is provided using one of sliding contacts and bearings.

32. The encoder of claim 30, wherein said galvanic energy feed is provided using two ball bearings, an alternating voltage being fed using said two ball bearings both capacitively and galvanically.

33. The encoder of claim 15, further including a light source having an energy supply that is capacitively fed to said shaft using metal surfaces.

34. The encoder of claim 33, wherein said metal surfaces are included in housing and are spaced apart axially and surround said shaft coxially as annular bands.

35. The encoder of claim 34, wherein two of said metal surfaces are placed at a minimum radial distance from said shaft to increase capacitance.

36. An encoder comprising:

a rotating shaft;

a partial disk connected nonrotatably centrically with the rotating shaft, the partial disk including an absolute or incremental code having a plurality of alternating translucent and non-translucent areas;

an illuminating unit; and a scanning receiver located axially in front of a first end of the rotating shaft, wherein the illuminating unit is connected nonrotatably centrally with the rotating shaft and rotates with the rotating shaft on a side of said partial disk opposite the scanning receiver, said scanning receiver including a monolithic photoreceiver array comprising photosensitive sensor areas associated with an angular measurement of the partial disk.

* * * * *